United States Patent
Choi et al.

(10) Patent No.: US 12,525,635 B2
(45) Date of Patent: Jan. 13, 2026

(54) APPARATUS AND METHOD FOR MANUFACTURING SECONDARY BATTERY

(71) Applicant: LG Energy Solution, Ltd., Seoul (KR)

(72) Inventors: Dong Gi Choi, Daejeon (KR); Sang Don Lee, Daejeon (KR); Yoon Jong Oh, Daejeon (KR); Sang Uk Yeo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 508 days.

(21) Appl. No.: 17/790,863

(22) PCT Filed: Dec. 28, 2020

(86) PCT No.: PCT/KR2020/019229
§ 371 (c)(1),
(2) Date: Jul. 5, 2022

(87) PCT Pub. No.: WO2021/141311
PCT Pub. Date: Jul. 15, 2021

(65) Prior Publication Data
US 2023/0014724 A1    Jan. 19, 2023

(30) Foreign Application Priority Data
Jan. 7, 2020  (KR) .................. 10-2020-0002236

(51) Int. Cl.
*H01M 50/30* (2021.01)
*H01M 10/04* (2006.01)

(52) U.S. Cl.
CPC ... *H01M 10/0404* (2013.01); *H01M 10/0481* (2013.01); *H01M 10/049* (2013.01); *H01M 50/30* (2021.01)

(58) Field of Classification Search
CPC .. H01M 50/30; H01M 10/04; H01M 10/0404; H01M 10/0481
See application file for complete search history.

(56) References Cited

U.S. PATENT DOCUMENTS 5,846,671 A     12/1998  Stocchiero et al.
2003/0049527 A1*  3/2003  Yageta .............. H01M 50/553
                                                      429/129
(Continued)

FOREIGN PATENT DOCUMENTS

CN    201985210 U    9/2011
CN    103035950 A    4/2013
(Continued)

OTHER PUBLICATIONS

Extended European Search Report including Written Opinion for Application No. 20912515.2 dated Jul. 1, 2024, pp. 1-7.
(Continued)

*Primary Examiner* — Kenneth J Douyette
(74) *Attorney, Agent, or Firm* — Lerner David LLP

(57) ABSTRACT

The present invention relates to an apparatus and method for manufacturing a secondary battery. The apparatus for manufacturing a secondary battery comprises a fixing part configured to press and fix a cell comprising an electrode assembly, an electrolyte, and a battery case configured to accommodate the electrode assembly and the electrolyte, wherein the cell is fixed so that a gas pocket part is disposed above a main body of the battery case, a piercing part configured to pierce the fixed cell through a knife so as to form a gas discharge hole, a vacuum part through which the cell is maintained in a vacuum state, and an internal gas of the cell is discharged to the outside, a leakage prevention part configured to prevent the electrolyte from leaking by pressing the gas pocket part of the cell, in which the internal gas is discharged through the vacuum part, through a leakage prevention block, and a pre-sealing part configured to seal the gas pocket part.

14 Claims, 7 Drawing Sheets

(56) References Cited

U.S. PATENT DOCUMENTS

| | | | |
|---|---|---|---|
| 2010/0167118 A1* | 7/2010 | Liu | H01M 4/139 429/231.95 |
| 2013/0244095 A1 | 9/2013 | Min et al. | |
| 2019/0207183 A1 | 7/2019 | Park et al. | |
| 2019/0207241 A1 | 7/2019 | Park et al. | |
| 2020/0403263 A1 | 12/2020 | Bae et al. | |

FOREIGN PATENT DOCUMENTS

| | | |
|---|---|---|
| EP | 3474364 A1 | 4/2019 |
| JP | 109506736 A | 6/1997 |
| JP | 2014502025 A | 1/2014 |
| JP | 2015115161 A | 6/2015 |
| JP | 2017069079 A | 4/2017 |
| KR | 20130005892 A | 1/2013 |
| KR | 20130044705 A | 5/2013 |
| KR | 20130044776 A | 5/2013 |
| KR | 20140015647 A | 2/2014 |
| KR | 20140017908 A | 2/2014 |
| KR | 20140018695 A | 2/2014 |
| KR | 20150113660 A | 10/2015 |
| KR | 20160107730 A | 9/2016 |
| KR | 20170087250 A | 7/2017 |
| KR | 20170104205 A | 9/2017 |
| KR | 20180062835 A | 6/2018 |
| KR | 20180062839 A | 6/2018 |
| KR | 20180072934 A | 7/2018 |
| KR | 20180093792 A | 8/2018 |
| KR | 20190055595 A | 5/2019 |
| KR | 20190072410 A | 6/2019 |
| KR | 20190074591 A | 6/2019 |

OTHER PUBLICATIONS

International Search Report for Application No. PCT/KR2020/019229 mailed Apr. 19, 2021, pp. 1-3.

Search Report dated Oct. 23, 2025 from the Office Action for Chinese Application No. 202080085351.0 issued Oct. 24, 2025, pp. 1-3.

* cited by examiner

APPARATUS AND METHOD FOR MANUFACTURING SECONDARY BATTERY

CROSS-REFERENCE TO RELATED APPLICATION

The present application is a national stage entry under 35 U.S.C. § 371 of International Application No. PCT/KR2020/019229, filed on Dec. 28, 2020, published in Korean, which claims priority to Korean Patent Application No. 10-2020-0002236, filed on Jan. 7, 2020, the disclosures of which are hereby incorporated by reference herein in their entireties.

TECHNICAL FIELD

The present invention relates to an apparatus and method for manufacturing a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

However, in a degassing process for the secondary battery, which discharges an internal gas of the secondary battery to the outside when manufacturing the secondary battery, there has been a problem in that an electrolyte accommodated therein is discharged together to contaminate the secondary battery, thereby deteriorating battery performance.

[Prior Art Document] (Patent Document Korean Patent Publication No. 10-2014-0015647

DISCLOSURE OF THE INVENTION

Technical Problem

One aspect of the present invention is to provide an apparatus and method for manufacturing a secondary battery, which are capable of minimizing a phenomenon, in which an electrolyte accommodated in a battery case is discharged to the outside of the battery case when manufacturing the secondary battery.

Technical Solution

An apparatus for manufacturing a secondary battery according to an embodiment of the present invention comprises: a fixing part configured to press and fix a cell comprising an electrode assembly, an electrolyte, and a battery case configured to accommodate the electrode assembly and the electrolyte, wherein the cell is fixed so that a gas pocket part is disposed above a main body of the battery case, a piercing part configured to pierce the fixed cell through a knife so as to form a gas discharge hole, a vacuum part through which the cell is maintained in a vacuum state, and an internal gas of the cell is discharged to the outside, a leakage prevention part configured to prevent the electrolyte from leaking by pressing the gas pocket part of the cell, in which the internal gas is discharged through the vacuum part, through a leakage prevention block, and a pre-sealing part configured to seal the gas pocket part.

A method for manufacturing a secondary battery according to an embodiment of the present invention comprises a fixing step of pressing and fixing a cell comprising an electrode assembly, an electrolyte, and a battery case accommodating the electrode assembly and the electrolyte, wherein the cell is fixed so that a gas pocket part is disposed above a main body of the battery case, a piercing step of piercing the gas pocket part through a knife after fixing the cell to form a gas discharge hole, a vacuum step of maintaining the pierced cell in a vacuum state and discharging an internal gas of the cell to the outside, a leakage prevention step of pressing the gas pocket part to prevent the electrolyte from leaking after the internal gas is discharged through the vacuum step, and a pre-sealing step of sealing the gas pocket part after the leakage prevention step.

Advantageous Effects

According to the present invention, the internal gas of the cell may be discharged to the outside after the gas pocket part is disposed above the main body of the battery case to minimize the discharge of the electrolyte to the outside of the battery case, thereby preventing the battery performance from being deteriorated. At this time, the internal gas of the cell may be discharged to the outside after the cell is disposed vertically to minimize the discharge of the electrolyte.

In addition, according to the present invention, after the internal gas of the cell is discharged to the outside, the leakage prevention block may press the gas pocket part to pre-seal the gas pocket part, thereby preventing the electrolyte from being leaking through the gas pock part during the sealing.

MODE FOR CARRYING OUT THE INVENTION

Figure 1:
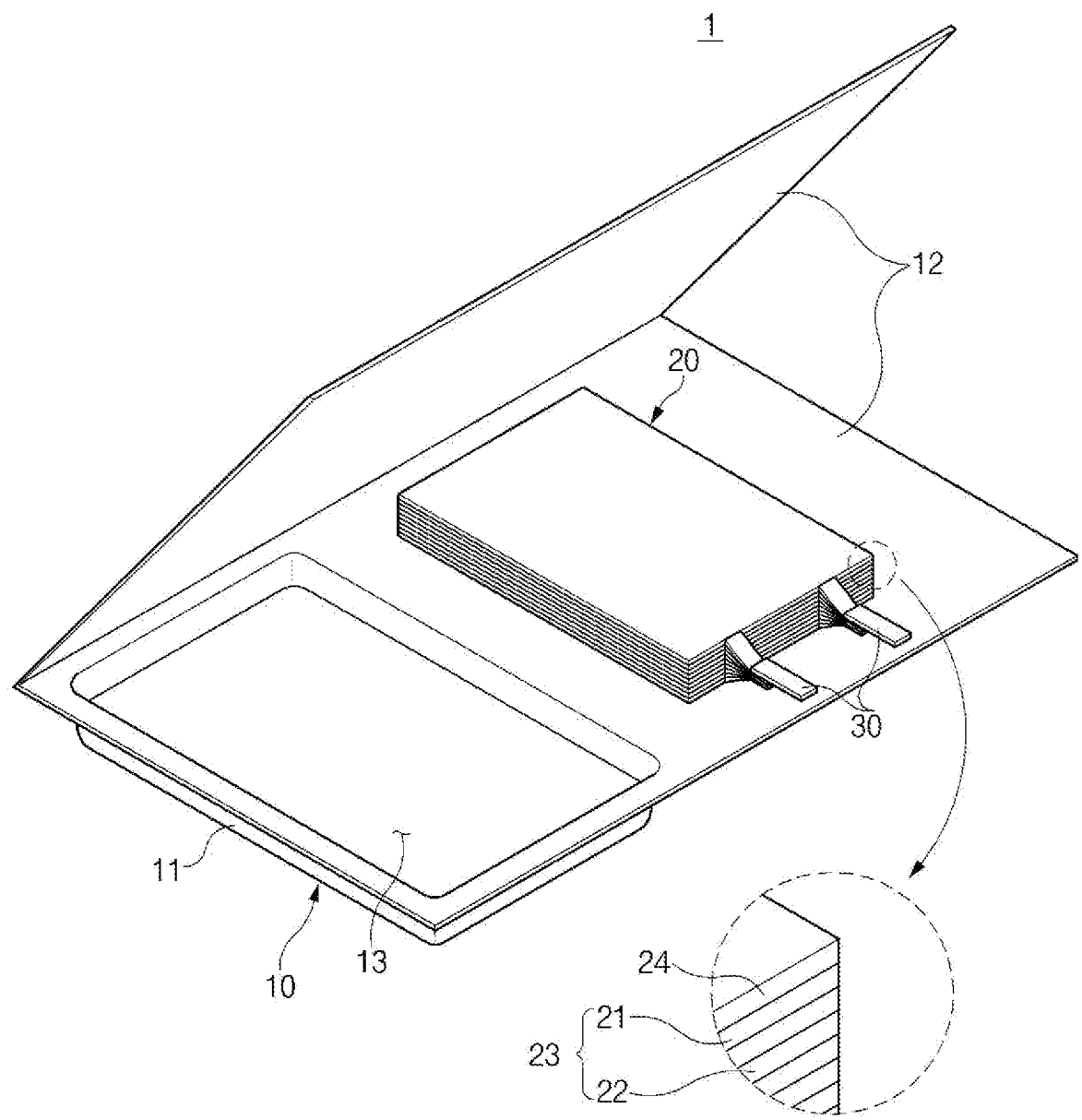
FIG. 1 is an exploded perspective view illustrating a cell applied to an apparatus for manufacturing a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Apparatus for Manufacturing Secondary Battery

Figure 2:
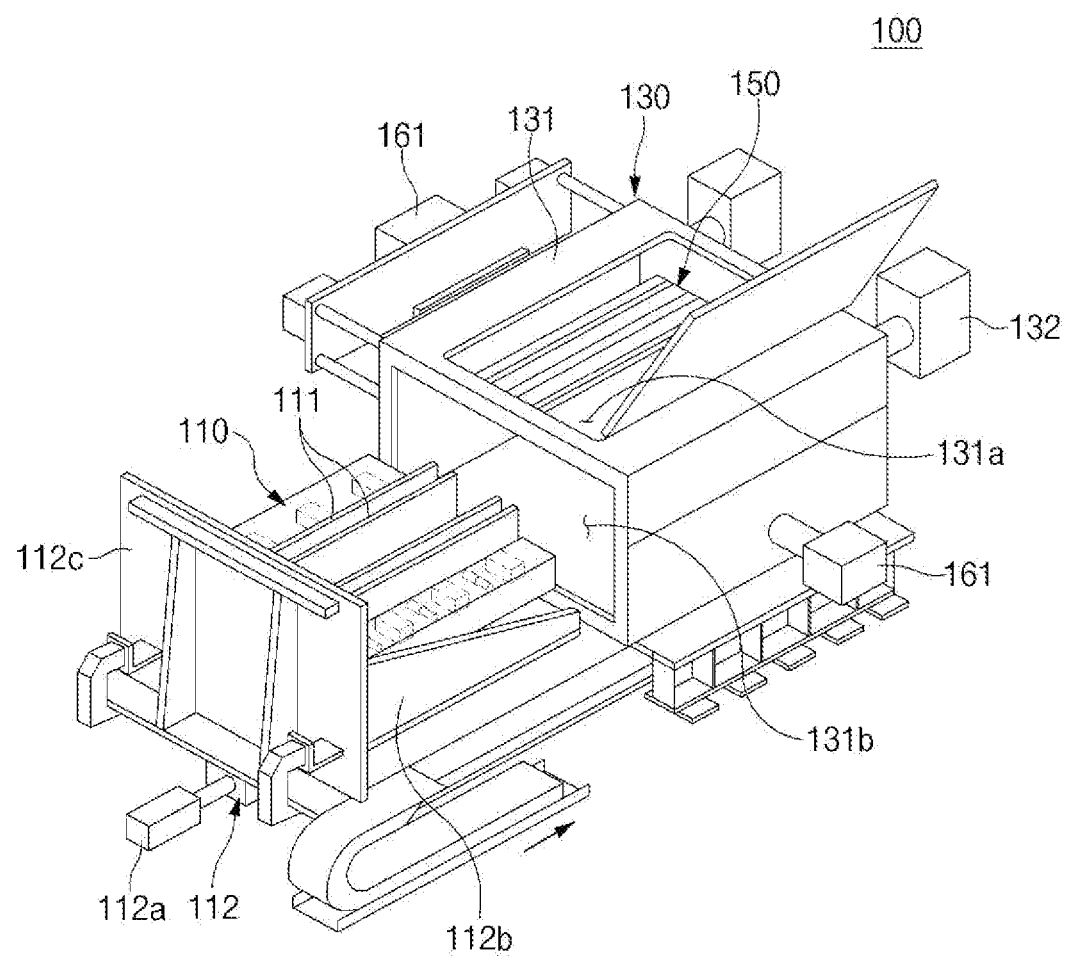
FIG. 2 is a perspective view illustrating the apparatus for manufacturing the secondary battery according to an embodiment of the present invention.
Figure 3:
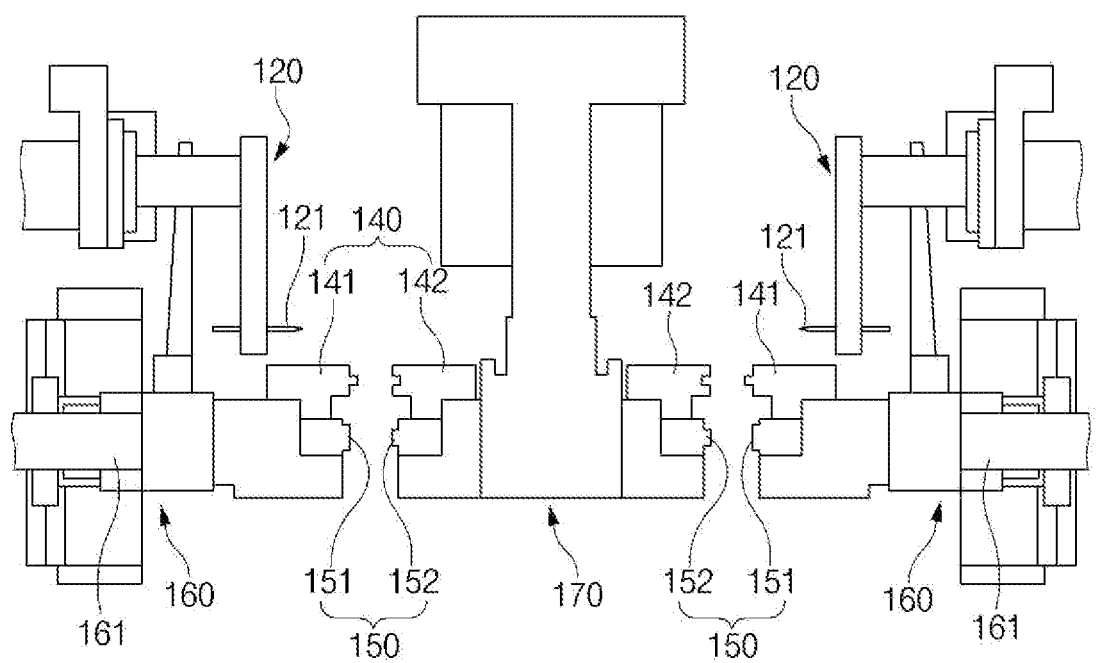
FIG. 3 is a front view illustrating a main part in the apparatus for manufacturing the secondary battery according to an embodiment of the present invention.

FIG. 1 is an exploded perspective view illustrating a cell applied to an apparatus for manufacturing a secondary battery according to an embodiment of the present invention, FIG. 2 is a perspective view illustrating the apparatus for manufacturing the secondary battery according to an embodiment of the present invention, and FIG. 3 is a front view illustrating a main part in the apparatus for manufacturing the secondary battery according to an embodiment of the present invention.

Referring to FIGS. 1 to 3, an apparatus 100 for manufacturing a secondary battery according to an embodiment of the present invention comprises a fixing part 110 pressing and fixing a cell 1, a piercing part 120 forming a gas discharge hole in the cell 1, a vacuum part 130 maintaining the cell 1 in a vacuum state, leakage prevention part 140 pressing a gas pocket part 12 of the cell 1 through leakage prevention blocks 141 and 142, and a pre-sealing part 150 sealing the gas pocket part 12.

Also, the apparatus 100 for manufacturing the secondary battery according to an embodiment of the present invention further comprises a moving part 160 and a mounting part 170.

Referring to FIG. 1, the cell 1 comprises a battery case 10, an electrode assembly 20 accommodated in an accommodation part 13 of the battery case 10, and an electrolyte. Also, the electrode assembly 20 may comprise an electrode lead 30 electrically connected to electrodes 23.

The electrode assembly 20 may be a chargeable and dischargeable power generation element and be formed by alternately stacking the electrodes 23 and a separator 24.

The electrodes 23 may comprise a positive electrode 21 and a negative electrode 22. Here, the electrode assembly may have a structure in which the positive electrode 21/the separator 24/the negative electrode 22 are alternately laminated. Also, the electrode lead 30 may comprise a positive electrode lead connected to the positive electrode 21 and a negative electrode lead connected to the negative electrode 22. Here, the electrode lead 30 is shown to be formed in one direction of the electrode assembly 20 in FIG. 1, but may also be formed in both directions of the electrode assembly 20

The positive electrode 21 may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode 22 may comprise a negative electrode collector and a negative electrode active material stacked on the negative electrode collector.

The negative electrode collector may be made of, for example, a foil made of a copper (Cu) material.

The negative active material may be a compound or a mixture containing a graphite-based material.

The separator 24 is made of an insulation material to electrically insulate the positive electrode 21 from the negative electrode 22. Here, the separator 24 may be made of a polyolefin-based resin film such as polyethylene or polypropylene having micropores.

Figure 4:
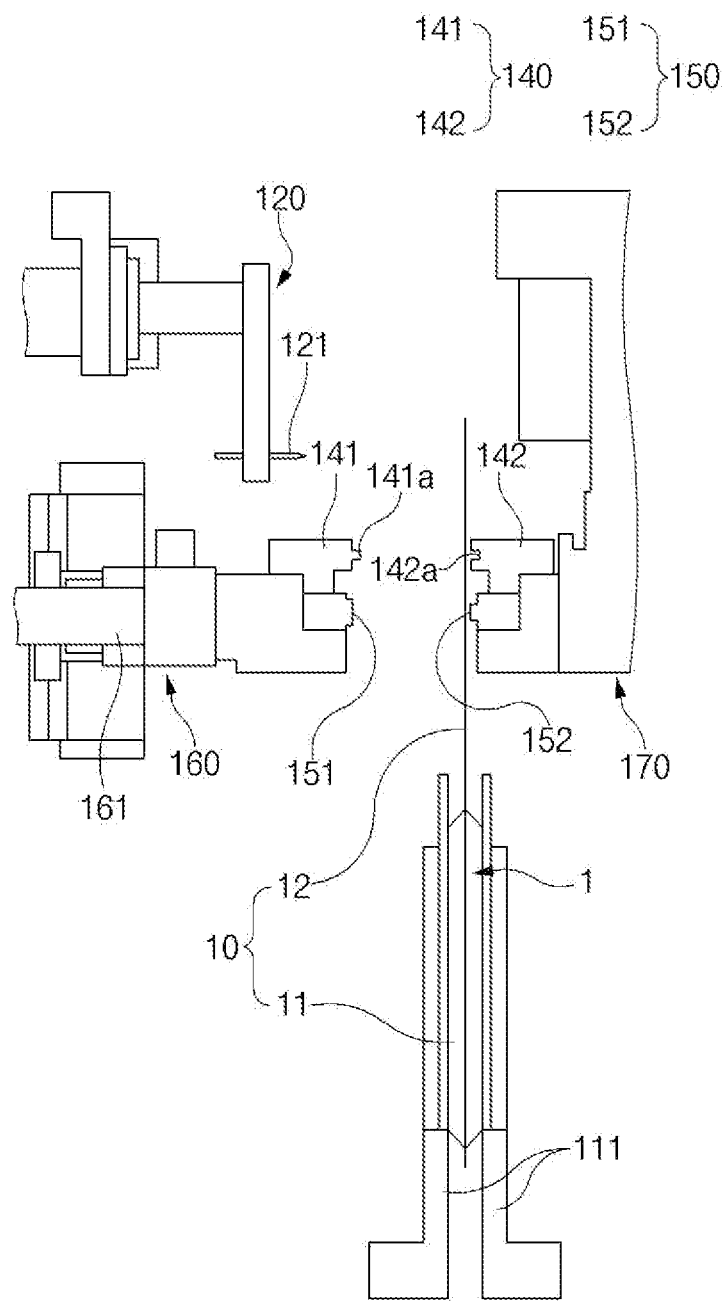
FIG. 4 is a front view illustrating a state in which the cell is fixed through a fixing part in the apparatus for manufacturing the secondary battery according to an embodiment of the present invention.

FIG. 4 is a front view illustrating a state in which the cell is fixed through a fixing part in the apparatus for manufacturing the secondary battery according to an embodiment of the present invention.

Referring to FIGS. 1 and 4, a fixing part 110 presses and fixes the cell 1 comprising the electrode assembly 20, the electrolyte, and the battery case 10 accommodating the electrode assembly 20 and the electrolyte. Here, the battery case 10 of the cell 1 may comprise a main body 11 in which the accommodation part 13 is formed and a gas pocket part 12 forming a passage extending from the accommodation part 13 to collect an internal gas. At this time, the fixing part 110 may fix the cell 1 so that the gas pocket part 12 is disposed above the main body 11 of the battery case 10. Thus, when the internal gas of the cell 1 is discharged to the outside, the electrolyte may be prevented from leaking through an end of the gas pocket part 12.

Also, the fixing part 110 may press and fix the main body 11 of the battery case 10 after the end of the gas pocket part 12 is disposed to face an upper side. At this time, the fixing part 110 may press and fix the cell 1 in a state in which the cell 1 is disposed vertically. Thus, the electrolyte may be more effectively prevented from leaking through the end of the gas pocket part 12 when the internal gas of the cell 1 is discharged to the outside. At this time, if the cell 1 is disposed horizontally in a vacuum chamber 131, one cell 1 may be processed, but if the cell 1 is disposed vertically, two or more cells 1 may be pressed in the vacuum chamber 131. Thus, a manufacturing quantity may increase, and manufacturing costs may decrease.

Furthermore, the fixing part 110 may comprise a pressing jig 111 pressing both surfaces of the cell 1. Here, the pressing jig 111 may be provided in a pair to press both the surfaces of the cell 1, i.e., press the main body 11 of the battery case 10. At this time, the pair of pressing jigs 111 may be mutually adjusted in distance therebetween by an actuator (not shown) to adjust pressing force applied to the cell 1.

Also, the fixing part 110 may further comprise a fixing part moving means 112 moving the pressing jig 111. Here, the fixing part moving means 112 may move the pressing jig 111 to an inner space 131a of the vacuum chamber 131. At this time, the pressing jig 111 supports the cell 1 when performing a piercing step and a vacuum step on the cell 1 disposed in the vacuum chamber 131, thereby realizing excellent processability.

The fixed part moving means 112 may comprise a moving motor 112a, a screw shaft (not shown) rotating by rotation of the moving motor 112a, and a fixing part frame 112b which is moved along the screw shaft according to rotation of the screw shaft and on which the pressing jig 111 is mounted. Here, since a technology of linearly moving a device in a direction of the screw shaft according to the rotation of the screw shaft is a technique known in the art, detailed descriptions will be omitted.

Also, when the fixing part moving means 112 may further comprise a sealing plate 112c that closes a side opening 131b of the vacuum chamber 131 when moving the pressing jig 111 to the inner space 131a through the side opening 131b of the vacuum chamber 131.

Figure 5:
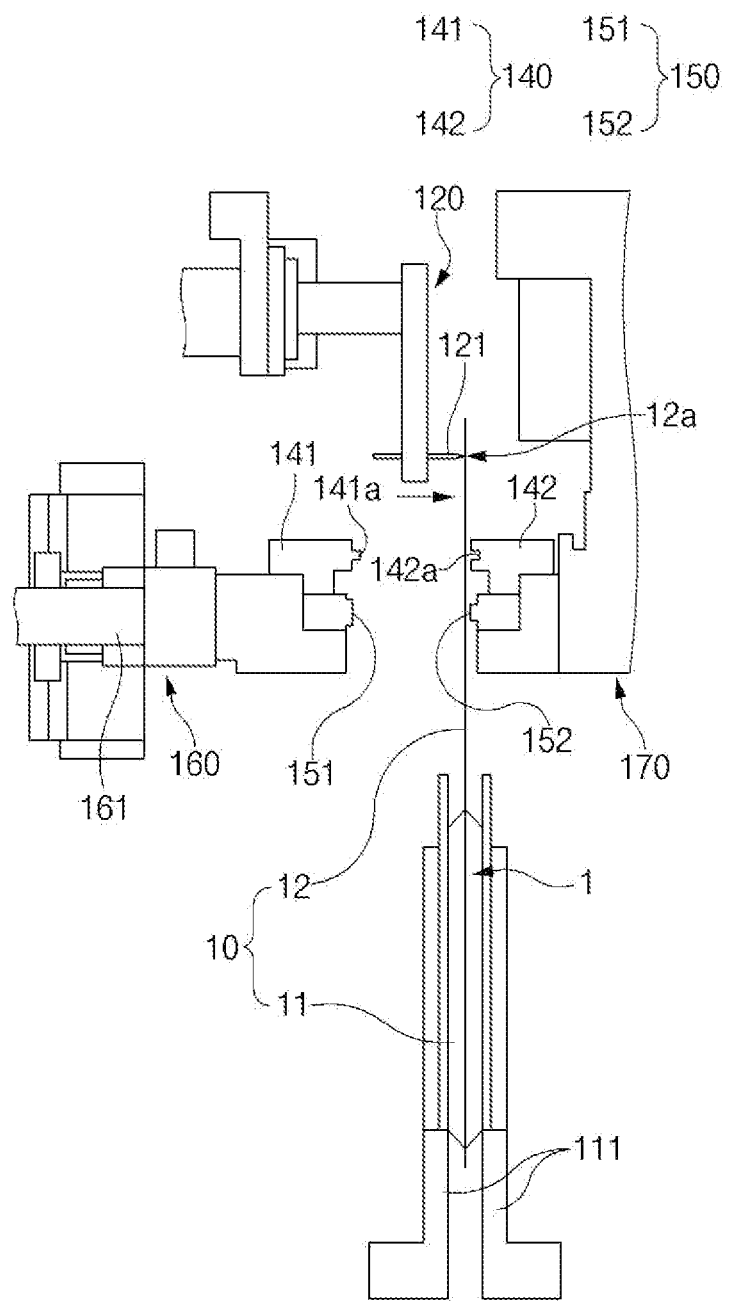
FIG. 5 is a front view illustrating a state in which the cell is pierced through a piercing part in the apparatus for manufacturing the secondary battery according to an embodiment of the present invention.

FIG. 5 is a front view illustrating a state in which the cell is pierced through the piercing part in the apparatus for manufacturing the secondary battery according to an embodiment of the present invention.

Referring to FIG. 5, the piercing part 120 may pierce the fixed cell 1 through a knife 121 to form a gas discharge hole.

Also, the piercing part 120 may form the gas discharge hole in a first portion 12a of the gas pocket part 12.

Furthermore, the piercing part 120 may move the needle-shaped knife 121 to allow the knife 121 to pass through the first portion 12a of the gas pocket part 12. At this time, the knife 121 may be moved through the actuator (not shown).

Referring to FIGS. 1 to 3, the vacuum part 130 may maintain the cell 1 in a vacuum state and discharge the gas within the cell 1 to the outside. Here, in the cell 1, the gas discharge hole is formed in the gas pocket part 12 through the piercing part 120 so that the internal gas is discharged to the outside of the cell 1 through the gas discharge hole.

Also, the vacuum part 130 may comprise a vacuum chamber 131 having an inner space 131a formed therein and a vacuum pump 132 forming the inner space 131a of the vacuum chamber 131 into a vacuum state.

Furthermore, the vacuum part 130 may accommodate the cell 1 in the vacuum chamber 131 and then may vacuum the inside of the vacuum chamber 131 to maintain the cell 1 in the vacuum state.

Also, the leakage prevention part 140 and the pre-sealing part 150 may be disposed inside the vacuum chamber 131 to operate in the process of maintaining the vacuum state of the cell 1 in the vacuum part 130. Here, the leakage prevention part 140 and the pre-sealing part 150 may be disposed inside the vacuum chamber 131. Each of the leak prevention part 140 and the pre-sealing parts 150 may be provided in plurality inside the vacuum chamber 131 to process the plurality of cells 1 at the same time. (The piercing part 120, the leakage prevention part 140, and the pre-sealing part 150 are disposed inside the vacuum chamber 131, but only the pre-sealing part 150 is illustrated in FIG. 2 for convenience.)

Figure 6:
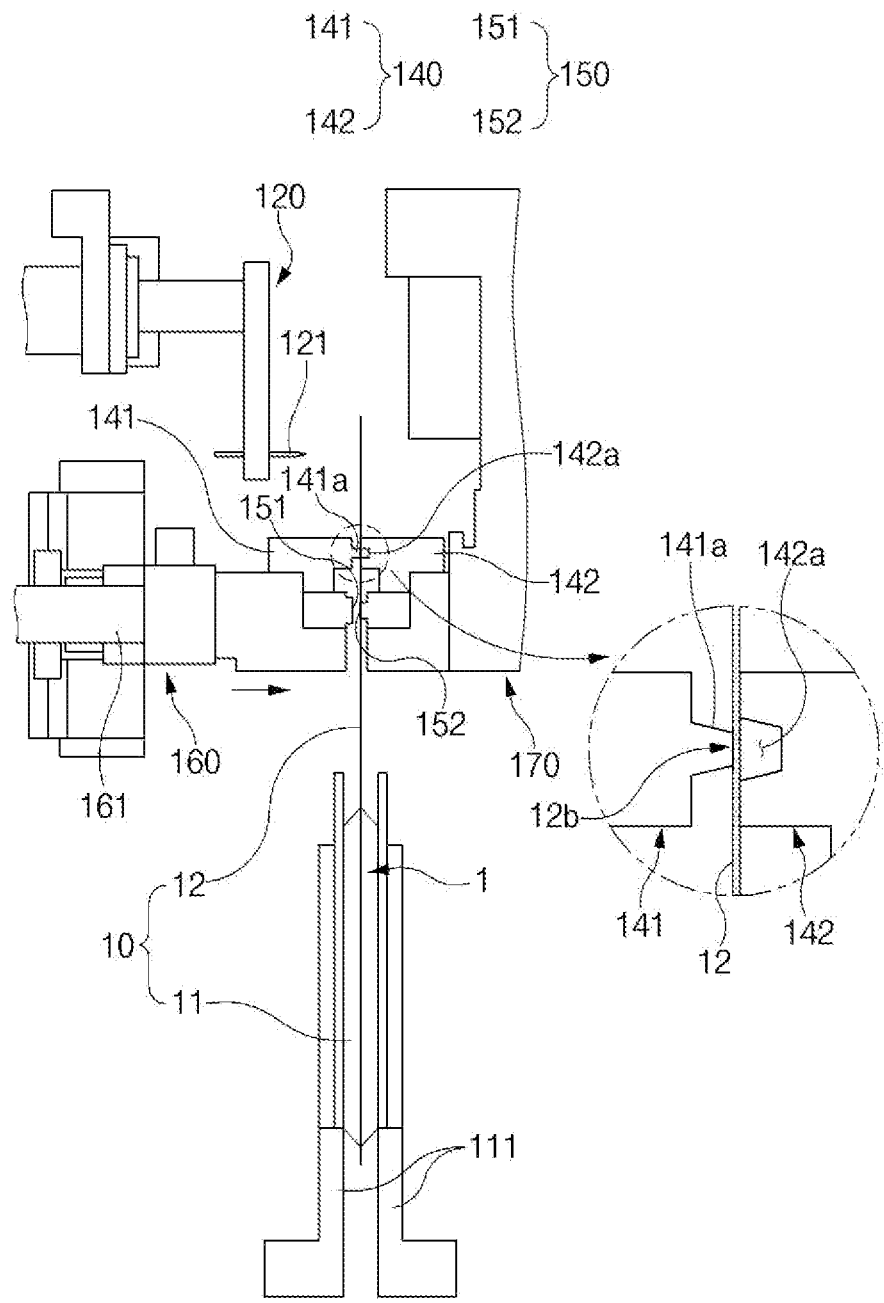
FIG. 6 is a front view illustrating a state in which the cell is pressed through a leakage prevention part in the apparatus for manufacturing the secondary battery according to an embodiment of the present invention.
Figure 7:
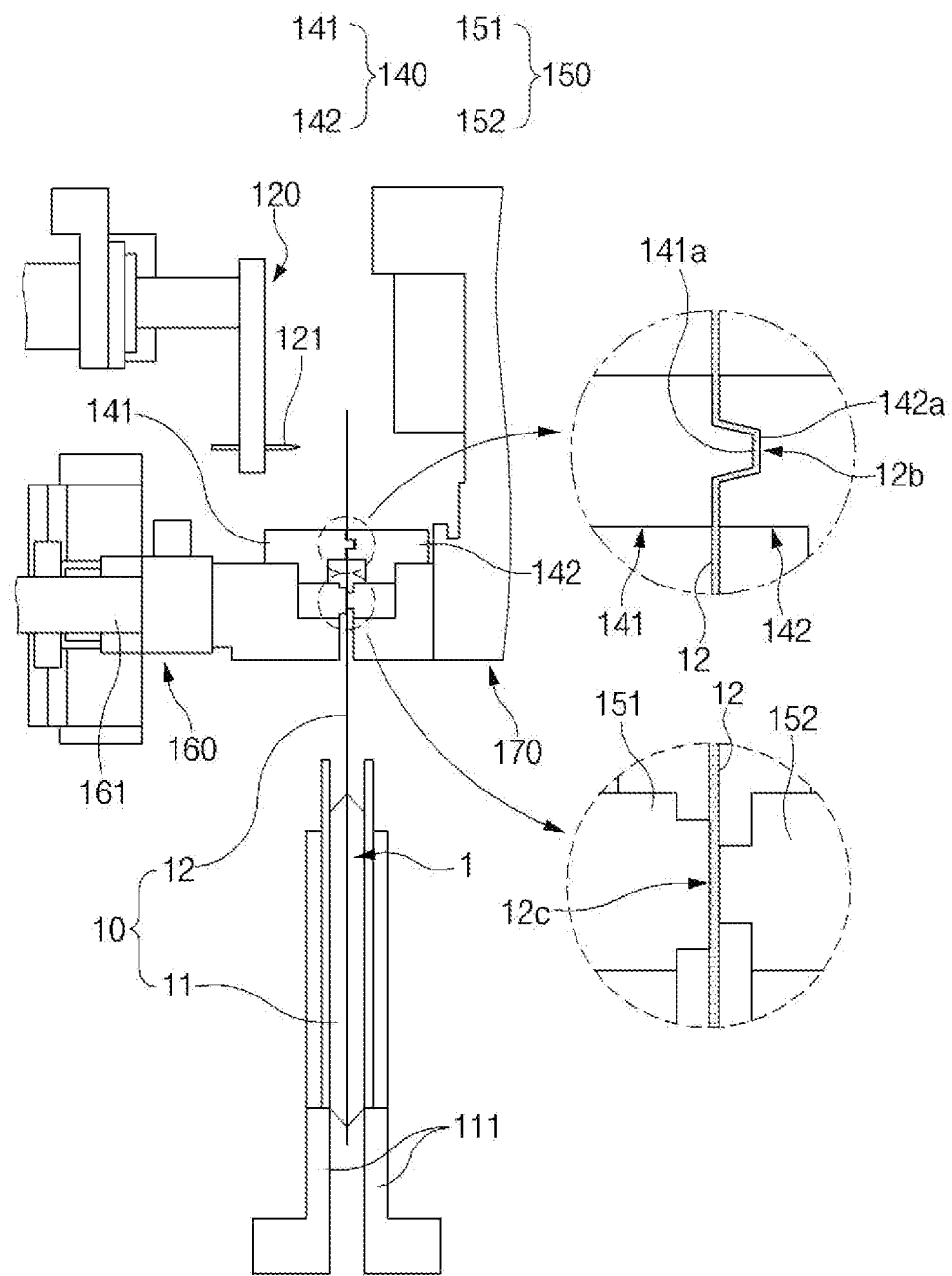
FIG. 7 is a front view illustrating a state in which the cell is pressed and pre-sealed through the leakage prevention part and the pre-sealing part in the apparatus for manufacturing the secondary battery according to an embodiment of the present invention.

FIG. 6 is a front view illustrating a state in which the cell is pressed through the leakage prevention part in the apparatus for manufacturing the secondary battery according to an embodiment of the present invention, and FIG. 7 is a front view illustrating a state in which the cell is pressed and pre-sealed through the leakage prevention part and the pre-sealing part in the apparatus for manufacturing the secondary battery according to an embodiment of the present invention.

Referring to FIGS. 6 and 7, the leakage prevention part 140 may press the gas pocket part 12 of the cell 1, from which the internal gas is discharged through the vacuum part 130, by using leakage prevention blocks 141 and 142, to prevent the electrolyte from leaking when the gas pocket part 12 is sealed through the pre-sealing part 150.

Also, the leakage prevention part 140 may press a second portion 12b disposed below the first portion 12a, in which the gas discharge hole is formed, in the gas pocket part 12.

The leakage prevention blocks 141 and 142 may comprise a first leakage prevention block 141 and a second leakage prevention block 142, which press both surfaces of the gas pocket part 12 of the cell 1.

The first leakage prevention block 141 may be provided with a protrusion 141a protruding in a direction of the second leakage prevention block 142. The second leakage prevention block 142 may have an insertion groove 142a into which an end of the protrusion 141a of the first leakage prevention block 141 is inserted.

The protrusion 141a of the first leakage prevention block 141 and the insertion groove 142a of the second leakage prevention block 142 may be formed in a horizontal direction.

Also, the protrusion 141a of the first leakage prevention block 141 and the insertion groove 142a of the second leakage prevention block 142 may be formed in shapes corresponding to each other.

Also, the protrusion 141a of the first leakage prevention block 141 may be formed in a rectangular or trapezoidal protrusion shape, and the insertion groove 142a of the second leakage prevention block 142 may be formed in a rectangular or trapezoidal groove shape. Here, the protrusion 141a may be formed in a shape in which a thickness of the protrusion gradually decreases in the direction of the insertion groove 142a, and the insertion groove 142a may be formed in a shape corresponding thereto.

Here, the second portion 12b of the gas pocket part 12, which is between the protrusion 141a of the first leakage prevention block 141 and the insertion groove 142a of the second leakage prevention block 142 may be pressed when the protrusion 141a is inserted into the insertion groove 142a and be bent in a shape corresponding to the shape of each of the protrusion 141a and the insertion groove 142a. Here, the second portion 12b of the gas pocket part 12 may be bent in a "⊏" shape.

Referring to FIG. 7, the pre-sealing part may seal the gas pocket part 12.

Also, the pre-sealing part 150 may seal a third portion 12c disposed below the second portion 12b pressed through the leakage prevention blocks 141 and 142 in the gas pocket part 12.

Furthermore, the pre-sealing part 150 may comprise a first sealing block 151 and a second sealing block 152, which press both the surfaces of the gas pocket part 12 by applying heat to seal the gas pocket part 12.

An end of each of the first sealing block 151 and the second sealing block 152 may protrude in the horizontal direction to press the third portion 12c of the gas pocket part 12, thereby forming a sealed portion in the horizontal direction.

The first leakage prevention block 141 and the second sealing block 151 may be mounted on the moving part 160, and the second leakage prevention block 142 and the second sealing block 152 may be mounted on the mounting part 170.

Here, the moving part 160 may move the first leakage prevention block 141 and the first sealing block 151 in a direction facing the second leakage prevention block 142 and the second sealing block 152.

Also, the moving part 160 may further comprise a cylinder 161, which moves the first leakage prevention block 141 and the first sealing block 151. Here, the cylinder 161 may be provided as a pneumatic actuator or a hydraulic actuator.

As an example, when the second portion 12b of the gas pocket part 12 is pressed by the leakage prevention blocks 141 and 142 of the leakage prevention part 140, the pre-sealing part 150 may simultaneity seal the third portion 12c of the gas pocket part 12.

As another example, the pre-sealing part 150 may seal the third portion 12c of the gas pocket part 12 after the second portion 12b of the gas pocket part 12 is pressed by the leakage prevention blocks 141 and 142 of the leakage prevention part 140. Here, a mutual distance between the first and second leak prevention blocks 141 and 142 may be closer than that between the first and second sealing blocks 151 and 152. Thus, when the first leakage prevention block 141 and the first sealing block 151 are moved through the moving part 160, the second sealing block 152 The block 141 and the second leakage prevention block 142 may press the gas pocket part 12 first rather than the first sealing block 151 and the second sealing block 152.

Method for Manufacturing Secondary Battery

Hereinafter, a method for manufacturing a secondary battery according to an embodiment of the present invention will be described.

Referring to FIGS. 1 to 3, a method for manufacturing a secondary battery according to an embodiment of the present invention comprises a fixing step of pressing and fixing a cell 1, a piercing step of piercing the cell 1 through a knife 121 to form a gas discharge hole, a vacuum step of maintaining the pierced cell 1 in a vacuum state, a leakage prevention step of pressing a gas pocket part 12 to prevent an electrolyte from leaking, and a pre-sealing step of sealing the gas pocket part 12.

A pre-degassing method for manufacturing the secondary battery according to an embodiment of the present invention is a method for manufacturing a secondary battery through the apparatus 100 for manufacturing the secondary battery according to an embodiment of the present invention. Thus, in descriptions of the method for manufacturing the secondary battery according to this embodiment of the present invention, contents duplicated with the apparatus 100 for manufacturing the secondary battery according to forgoing embodiment of the present invention will be omitted or briefly described, and also, differences therebetween will be mainly described.

In more detail, referring to FIGS. 1 and 4, in the fixing step, the cell 1 comprising the electrode assembly 20, the electrolyte, and the battery case 10 accommodating the electrode assembly 20 and the electrolyte may be pressed and fixed.

Also, in the fixing step, the cell 1 may be fixed through the fixing part 110 so that the gas pocket part 12 is disposed above the main body 11 of the battery case 10. Here, the battery case 10 of the cell 1 may comprise a main body 11 in which the accommodation part 13 is formed and a gas pocket part 12 forming a passage extending from the accommodation part 13 to collect an internal gas. Here, in the fixing step, the end of the gas pocket part 12 may be disposed to face an upper side and then press and fix the main body 11 of the battery case 10. Thus, in the fixing step, the electrolyte may be prevented from leaking through an end of the gas pocket part 12 when the internal gas of the cell 1 is discharged to the outside.

Furthermore, in the fixing step, the fixing part 110 may press and fix the cell 1 in a state in which the cell 1 is disposed vertically. Thus, the electrolyte may be more effectively prevented from leaking through the end of the gas pocket part 12 when the internal gas of the cell 1 is discharged to the outside.

Also, in the fixing step, both surfaces of the cell 1 may be pressed through the pressing jig of the fixing part 110.

Here, in the fixing step, the cell 1 fixed to the pressing jig 111 through the fixing part moving means 112 may be moved to the inner space 131a of the vacuum chamber 131. Here, the pressing jig 111 may support the cell 1 to realize superior processability when the piercing step and the vacuum step are performed.

Referring to FIG. 5, in the piercing step, after the cell 1 is fixed, the gas pocket part 12 may be pierced through the knife 121 of the piercing part 120 to form the gas discharge hole.

Also, in the piercing step, the gas discharge hole may be formed in the first portion 12a of the gas pocket part 12.

Furthermore, in the piercing step, the needle-shaped knife 121 may be moved to pass through the first portion 12a of the gas pocket part 12.

Referring to FIGS. 1 and 2, in the vacuum step, the pierced cell 1 is maintained in a vacuum state through the vacuum part 130, and the internal gas of the cell 1 may be discharged to the outside.

Also, in the vacuum step, after accommodating the cell 1 in the vacuum chamber 131 of the vacuum part 130, the inside of the vacuum chamber 131 may be vacuumed to maintain the cell 1 in the vacuum state. At this time, in the cell 1, the gas discharge hole is formed in the gas pocket part 12 through the piercing step so that the internal gas is discharged to the outside of the cell 1 through the gas discharge hole.

Here, the inner space 131a of the vacuum chamber 131 may be formed in the vacuum state through a vacuum pump 132 of the vacuum part 130.

Referring to FIGS. 6 and 7, in the leakage prevention step, after the internal gas is discharged through the vacuum step, the gas pocket part 12 may be pressed by the leakage prevention blocks 141 and 142 to prevent the electrolyte from leaking when the gas pocket part 12 is sealed in the pre-sealing step.

Also, in the leakage preventing step, the second portion 12b disposed below the first portion 12a, in which the gas discharge hole is formed, in the gas pocket part 12 may be pressed.

The leakage prevention blocks 141 and 142 may comprise a first leakage prevention block 141 and a second leakage prevention block 142, which press both surfaces of the gas pocket part 12 of the cell 1.

The first leakage prevention block 141 may be provided with a protrusion 141a protruding in a direction of the second leakage prevention block 142. The second leakage prevention block 142 may have an insertion groove 142a into which an end of the protrusion 141a of the first leakage prevention block 141 is inserted.

The protrusion 141a of the first leakage prevention block 141 and the insertion groove 142a of the second leakage prevention block 142 may be formed in a horizontal direction.

Also, the protrusion 141a of the first leakage prevention block 141 and the insertion groove 142a of the second leakage prevention block 142 may be formed in shapes corresponding to each other.

Also, the protrusion 141a of the first leakage prevention block 141 may be formed in a rectangular protrusion shape, and the insertion groove 142a of the second leakage prevention block 142 may be formed in a rectangular groove shape.

Here, the second portion 12b of the gas pocket part 12, which is between the protrusion 141a of the first leakage prevention block 141 and the insertion groove 142a of the second leakage prevention block 142 may be pressed when the protrusion 141a is inserted into the insertion groove 142a in the leakage prevention step and be bent in a shape corresponding to the shape of each of the protrusion 141a and the insertion groove 142a. Here, in the leakage preventing step, the second portion 12b of the gas pocket part 12 may be bent in a "⊏" shape.

Referring to FIG. 7, in the pre-sealing step, the gas pocket part 12 may be sealed through the pre-sealing part 150 after the leakage prevention step.

Also, in the pre-sealing step, a third portion 12c disposed below the second portion 12b pressed through the leakage prevention blocks 141 and 142 in the gas pocket part 12 may be sealed.

Here, the pre-sealing part 150 may comprise a first sealing block 151 and a second sealing block 152, which press both the surfaces of the gas pocket part 12 by applying heat to seal the gas pocket part 12.

Also, in the pre-sealing step, an end of each of the first sealing block 151 and the second sealing block 152 may protrude in the horizontal direction to press the third portion 12c of the gas pocket part 12, thereby forming a sealed portion in the horizontal direction.

The leakage prevention step and the pre-sealing step may be performed during the process of maintaining the vacuum state of the cell 1 in the vacuum step.

As an example, the leakage prevention step and the pre-sealing step may be performed at the same time. That is, when the second portion 12b of the gas pocket part 12 is pressed by the leakage prevention blocks 141 and 142 of the leakage prevention part 140, the pre-sealing part 150 may simultaneity seal the third portion 12c of the gas pocket part 12.

As another example, after the gas pocket part 12 is pressed by the leakage prevention blocks 141 and 142 in the leakage prevention step, the pre-sealing step may be performed. Here, in the pre-sealing step, after the second portion 12b of the gas pocket part 12 is pressed by the leakage prevention blocks 141 and 142, the third portion 12c of the gas pocket part 12 may be sealed. Here, a mutual distance between the first and second leak prevention blocks 141 and 142 may be closer than that between the first and second sealing blocks 151 and 152. Thus, in the leakage prevention step, when the first leakage prevention block 141 and the first sealing block 151 are moved through the moving part 160, the second sealing block 152 The block 141 and the second leakage prevention block 142 may press the gas pocket part 12 in advance rather than the first sealing block 151 and the second sealing block 152. Here, in the leakage prevention step, the first leakage prevention block 141 and the first sealing block 151 may be mounted on the moving part 160, and the first leakage prevention block 141 and the first sealing block 151 may be moved by the moving part 160 in the direction facing the second leakage prevention block 142 and the second sealing block 152.

In the method of manufacturing the secondary battery according to an embodiment of the present invention, after a pre-degassing process, the remaining portion of the gas pocket part 12 except for the sealed part of the battery case 10 may be removed to manufacture the secondary battery.

In addition, the secondary battery manufacturing method according to the embodiment of the present invention may further comprise a first charging step of primarily charging the cell 1 before the vacuum step and a second charging/discharging step of charging and discharging the cell 1 after the pre-sealing step.

While the present invention has been described in detail with reference to exemplary embodiments, it is to be understood that the scope of the present invention is not limited to the apparatus and method for manufacturing the secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

1: Cell
10: Cell case
11: Main body
12: Gas pocket part
12a: First portion
12b: Second portion
12c: Third portion
13: Accommodation part
20: Electrode assembly
21: Positive electrode
22: Negative electrode
23: Electrode
24: Separator
30: Electrode lead
100: Apparatus for manufacturing secondary battery
110: Fixing part
111: Pressing jig
112: Fixing part moving means
112a: Moving motor
112b: Fixing part frame
112c: Sealing plate
120: Piercing part
121: Knife
130: Vacuum part
131: Vacuum chamber
131a: Inner space
131b: Side opening
132: Vacuum pump
140: Leakage prevention part
141: First leakage prevention block
141a: Protrusion
142: Second leakage prevention block
142a: Insertion groove
150: Pre-sealing part
151: First sealing block
152: Second sealing block
160: Moving part
161: Cylinder
170: Mounting part

The invention claimed is:

1. An apparatus for manufacturing a secondary battery, the apparatus comprising:
a fixing part configured to press and fix a cell comprising an electrode assembly, an electrolyte, and a battery case having a main body accommodating the electrode assembly and the electrolyte therein, the fixing part being configured such that an end of a gas pocket part of the cell is disposed above a remainder of the cell;
a piercing part configured to pierce the cell with a knife so as to form a gas discharge hole in a first portion of the gas pocket part;
a vacuum part configured to establish a vacuum state around the cell, so that the vacuum state causes an internal gas of the cell to be discharged to an outside of the cell;
a leakage prevention part configured to prevent the electrolyte from leaking out of the cell, the leakage prevention part configured to press a second portion of the gas pocket part of the cell below the first portion with a leakage prevention block; and
a pre-sealing part configured to seal a third portion of the gas pocket part below the second portion, thereby sealing the main body of the battery case.

2. The apparatus of claim 1, wherein the pre-sealing part comprises a first sealing block and a second sealing block, which are configured to press and seal first and second opposite surfaces of the gas pocket part by applying heat, and
the leakage prevention part comprises a first leakage prevention block and a second leakage prevention block that are configured to press the first and second opposite surfaces of the gas pocket part,
wherein the first leakage prevention block has a protrusion protruding toward the second leakage prevention block, and
the second leakage prevention block has an insertion groove into which an end of the protrusion of the first leakage prevention block is configured to be inserted.

3. The apparatus of claim 2, further comprising:
a moving part on which the first leakage prevention block and the first sealing block are mounted; and
a mounting part on which the second leakage prevention block and the second sealing block are mounted,
wherein the moving part is configured to move the first leakage prevention block and the first sealing block in a direction towards the second leakage prevention block and the second sealing block, respectively.

4. The apparatus of claim 1, wherein, the apparatus is configured such that when the second portion of the gas pocket part is pressed by the leakage prevention block of the leakage prevention part, the pre-sealing part simultaneously seals the third portion of the gas pocket part.

5. The apparatus of claim 3, wherein the apparatus is configured such that the pre-sealing part seals the third portion of the gas pocket part after the second portion of the gas pocket part is pressed by the leakage prevention block of the leakage prevention part.

6. The apparatus of claim 5, wherein a distance between the first leakage prevention block and the second leakage prevention block is closer than a distance between the first sealing block and the second sealing block, and
the apparatus is configured such that when the first leakage prevention block and the first sealing block are moved by the moving part, the first leakage prevention block and the second leakage prevention block press the gas pocket part before the first sealing block and the second sealing block.

7. The apparatus of claim 2, wherein the fixing part is configured to fix the cell such that the gas pocket part overlies the main body in a vertical direction, and
the protrusion of the first leakage prevention block and the insertion groove of the second leakage prevention block are configured to move towards one another in a horizontal direction perpendicular to the vertical direction.

8. The apparatus of claim 1, wherein the vacuum part is configured to establish the vacuum state in an inside of a vacuum chamber after the cell is disposed in the vacuum chamber, and
the apparatus is configured to move the leakage prevention part and the pre-sealing part while the vacuum state is maintained.

9. A method for manufacturing a secondary battery using the apparatus of claim 1, the method comprising:
a fixing step of pressing and fixing the cell, wherein the cell is oriented so that the gas pocket part is disposed above the main body of the battery case;
after the fixing step, a piercing step of piercing the gas pocket part with the knife to form the gas discharge hole;
after the piercing step, a vacuum step of establishing the vacuum state around the cell and discharging the internal gas of the cell to the outside of the cell;
after the vacuum step, a leakage prevention step of pressing the gas pocket part to prevent the electrolyte from leaking after the internal gas is discharged; and
a pre-sealing step of sealing the third portion of the gas pocket part, thereby sealing the main body of the battery case.

10. The method of claim 9, wherein, during the fixing step, the main body of the battery case is fixed such that the end of the gas pocket part overlies the main body in a vertical direction,
during the piercing step, the gas discharge hole is formed in the first portion of the gas pocket part,
during the leakage prevention step, the second portion of the gas pocket part is pressed, the second portion being disposed below the first portion in the vertical direction, and
during the pre-sealing step, the third portion of the gas pocket part is sealed, the third portion being disposed below the second portion.

11. The method of claim 10, wherein the leakage prevention step and the pre-sealing step are performed at the same time.

12. The method of claim 10, wherein, during the leakage prevention step, while the gas pocket part is pressed by the leakage prevention block, the pre-sealing step is performed.

13. The method of claim 9, wherein, during the vacuum step, the vacuum state is established in an inside of a vacuum chamber after disposing the cell in the vacuum chamber, and
the leakage prevention step and the pre-sealing step are performed while the vacuum state is maintained.

14. The method of claim 9, wherein, during the fixing step, the cell is fixed in an orientation in which the gas pocket part overlies the main body in a vertical direction.

* * * * *